March 21, 1961   C. J. ADAMS   2,976,463
MOTOR-PROTECTING RELAY
Filed Feb. 1, 1957   2 Sheets-Sheet 1
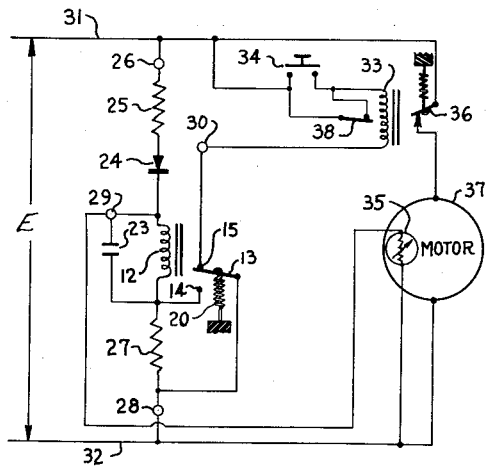
Fig. 1  MOTOR RUNNING
RELAY ENERGIZED
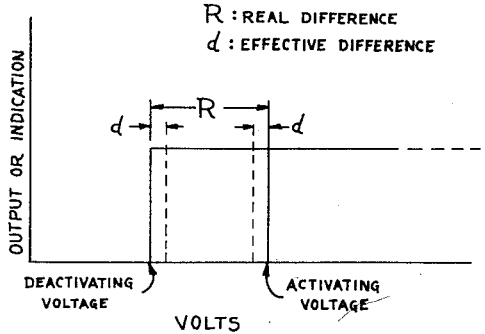
Fig. 7
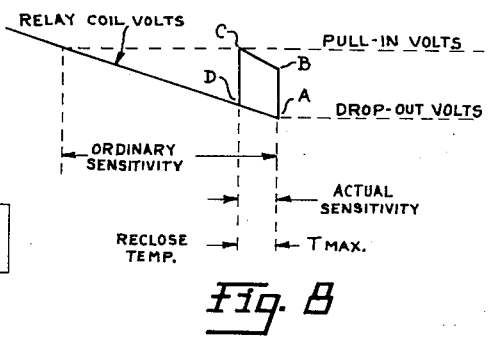
Fig. 8
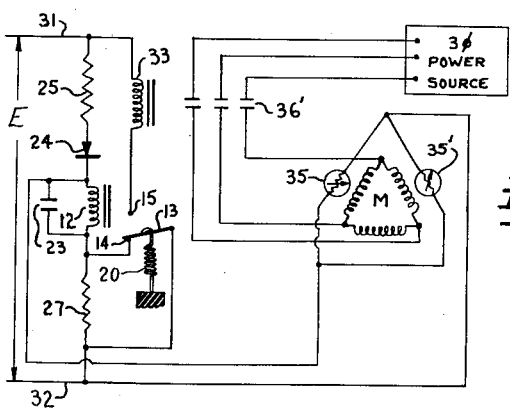
Fig. 2  MOTOR STOPPED
RELAY DE-ENERGIZED
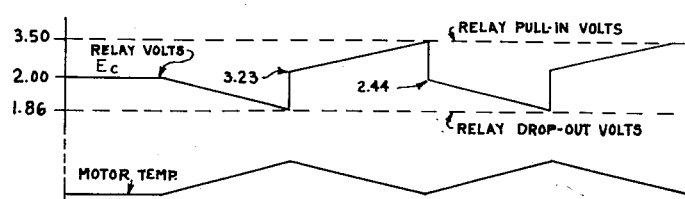
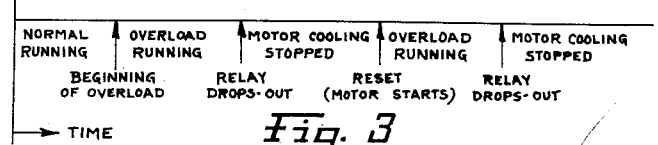
Fig. 3
INVENTOR.
CHARLES J. ADAMS
BY Robert T. Casey
HIS ATTORNEY March 21, 1961 C. J. ADAMS 2,976,463
MOTOR-PROTECTING RELAY
Filed Feb. 1, 1957 2 Sheets-Sheet 2

INVENTOR.
CHARLES J. ADAMS
BY Robert H. Casey
HIS ATTORNEY

United States Patent Office 2,976,463
Patented Mar. 21, 1961

2,976,463
MOTOR-PROTECTING RELAY

Charles J. Adams, Bloomington, Ill., assignor to General Electric Company, a corporation of New York Filed Feb. 1, 1957, Ser. No. 637,713

4 Claims. (Cl. 317—41)

My invention relates to electric relays and particularly to electric relays suitable for protecting the windings of an electric motor from damage by excessive temperature.

There has long been a need for a motor-protecting relay capable of operating by direct response to the internal temperature of motor windings. Presently known, practicable devices, for instance, operate indirectly, i.e., in response to current-and-time conditions, or in response to temperature of the motor frame or the ambient atmosphere adjacent the windings. With such indirectly operating devices, an overload which creates an excessively rapid increase in temperature in the winding may not actuate the protecting relay until too late.

Accordingly, there have been attempts to provide a motor-protecting relay utilizing a temperature-responsive electrical element embedded in a motor winding. Such attempts, however, have heretofore not produced satisfactory results. Such prior motor-protecting relays, for example, have not provided a sufficiently high degree of sensitivity. The term "sensitivity" is used herein to denote that characteristic of a temperature-sensitive relay or other bi-stable electrical device which indicates the amount of change of temperature or other variable required to change the relay from open to closed condition and vice versa. Thus, while it is desirable to have the motor removed from the line when the temperature of the windings exceeds a predetermined level, it is likewise desirable that it be possible to reconnect the motor to the line as soon as the windings have cooled below this same predetermined level by a small amount. Such sensitivity has been difficult to attain, however, largely because in electrically bi-stable devices generally and in ferro-magnetic devices particularly, there is a substantial difference between activating and deactivating signal levels. Thus, the drop-out voltage point of an iron-core relay, for instance, is substantially lower than its pull-in voltage point. A substantial change of control signal is therefore ordinarily necessary to change such a device from one stable condition to the other.

In addition to meeting these sensitivity requirements, a temperature-responsive type motor-protecting relay should be operable with a minimum of initial adjustment and should require no field adjustment; it should not be adversely affected by ordinarily encountered line voltage fluctuations, and its operation should be positive and free from vibration or "chattering." Prior attempts to utilize embedded temperature-responsive elements for the protection of motor windings have not produced satisfactory results in these respects.

It is a primary object of my invention to provide a motor-protecting relay adapted to utilize a signal developed by a temperature-responsive element embedded in the windings of a motor having a high degree of sensitivity despite the fact that its apparent energizing signal level is substantially different from its apparent de-energizing signal level.

It is a further object of my invention to provide a thermistor-type motor-protecting relay which is not adversely affected by ordinary line voltage fluctuations, and which may be readily adjusted upon initial manufacture.

Another object of my invention is to provide a thermistor-type motor overload protector which is positive-acting and not subject to chattering.

Other objects and advantages of my invention will become apparent from the following detailed description, and its scope will be pointed out in the appended claims.

In accordance with my invention, I provide an electric relay adapted to move to closed condition when a signal applied thereto rises above a predetermined level and to move to open condition when the signal drops below a predetermined level, which relay includes means operable upon closing of the relay for instantaneously reducing the effective value of the signal applied thereto to a value only slightly above the opening level, and for likewise instantaneously increasing the effective value of the signal applied thereto upon opening of the relay to a value only slightly less than the closing level, whereby the actual change required in the signal, in order to change the relay from one condition to the other, is minimized.

In accordance with my invention in one form, I provide an electric relay having a resistance in series therewith, and a set of contacts controlled by the relay adapted to short-circuit the resistance when the relay moves to open-circuit position, and to reinsert the resistance in series with the relay when the relay moves to closed-circuit position, the control signal being applied across the relay and resistance combination in series.

In accordance with another aspect of my invention, I utilize the self-heating effect of a thermistor to provide a positive-acting temperature-responsive relay system. In accordance with this aspect, I provide a circuit in which the voltage appearing across a thermistor is used to control a relay in such a way that when such voltage increases sufficiently to activate the relay, a portion of such voltage is removed from the relay, reducing the effective voltage to a value near the drop-out point. At the same time, the current through the thermistor is increased slightly, causing the resistance of the thermistor to decrease due to self-heating, thereby further decreasing the voltage on the relay and providing a tapering-off action which brings the final value of the remaining effective voltage very close to the drop-out voltage without overshooting so as to cause relay oscillation or chattering. A similar action is also obtained, in reverse, upon relay opening.

In the drawings:

Figure 1 is a schematic diagram of a motor-protecting relay embodying my invention, shown as connected to protect a single-phase electric motor;

Figure 2 is a schematic diagram of a motor-protecting relay embodying my invention, shown as connected to protect a three-phase motor;

Figure 3 is a graph showing the variation of relay coil voltage and motor temperature over a period of time comprising two overload and cooling cycles;

Figure 7 is a graph showing the relations existing between relay coil voltage and relay output or indication as the coil voltage is varied from below the deactivating point to above the activating point and vice versa;

Figure 8 is a portion of a graph showing the variation of relay voltage as a function of motor temperature through the critical temperature range.

Figure 4:
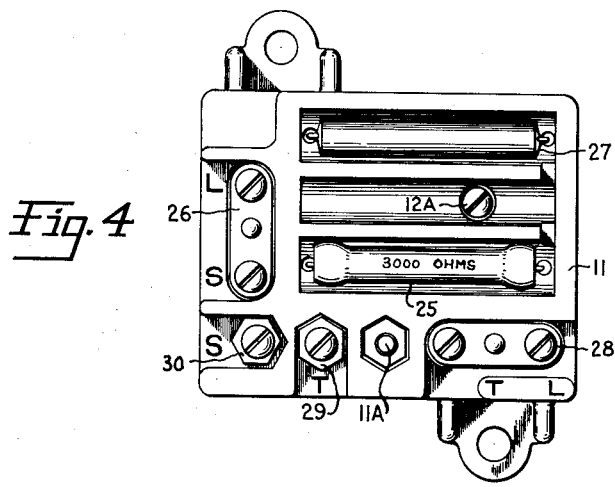
Figure 4 is a top plan view of a motor-protecting relay incorporating my invention.
Figure 5:
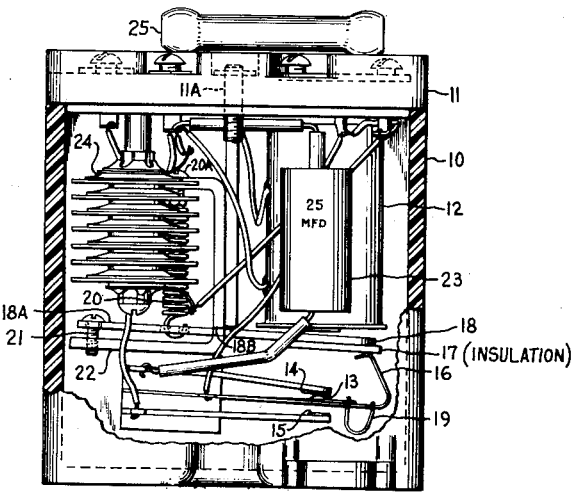
Figure 5 is an elevation view partly in section of the motor-protecting relay of Figure 4.

Referring now to the drawings, and especially to Figures 4 and 5, I have shown my invention as embodied in a motor-protecting relay including a generally rectangular insulating casing 10 and an insulating cover 11 secured thereto by suitable means such as by screw 11A and adapted to serve as a terminal board and also as a support for the electrical components. A single-pole double-throw relay of the snap-acting type including a coil 12 and a movable contact 13 is supported from the cover 11 by screw 12A. The movable contact 13 is in contact with stationary contact 14 when the coil 12 is de-energized, but is movable, upon closing movement of the armature 18, out of contact with stationary contact 14 and into contact with stationary contact 15.

The relay further comprises a resilient strip operating member 16, having its central portion cut away to provide two parallel leg portions extending along opposite sides of and coplanar with the movable contact 13. The strip 16 has its fixed end mounted in the same plane as the fixed end of contact 13 and has its opposite end return-bent and adapted to rest against insulating member 17 carried by the armature 18.

In order to provide a sensitive over-center or snap action, a generally U-shaped resilient spring member 19 is provided between the end of the contact member 13 and the bight of the operator 16. The strip 16 is inherently biased for movement toward the relay coil 12. The armature 18 and the insulating member 17 are maintained in the normal, unattracted position by tension spring 20, which pulls the armature extension 18A against the head of an adjusting screw 21 carried by the relay frame 22 on the opposite side of the armature pivot 18B from the coil 12.

When the relay armature 18 is drawn to the closed position by magnetic force in opposition to the tension spring 20, the spring operator 16 moves toward the relay core due to its inherent bias. This causes the spring 19 to go overcenter with respect to the end of the contact 13, moving the contact 13 to its opposite position, i.e., into contact with the stationary contact 15. When the armature 18 is released by the core, it is again moved outwardly by the spring 20, forcing the resilient operator 16 to its original position, and returning the contacts to their original position with a snap action.

Referring now particularly to Figure 1, the relay coil 12 is connected, in series with a rectifier 24 and a voltage-dropping resistor 25, to a terminal 26 and has a capacitor 23 connected in parallel therewith. The other end of the coil 12 is connected, in series with a bias resistor 27, to a second terminal 28. A terminal 29, is also provided, electrically common with the junction of the capacitor 23 and the relay coil 12 and the rectifier 24. The stationary contact 14 is connected to a point intermediate the coil 12 and the resistor 27, while the stationary contact 15 is connected to an external terminal 30.

In use, the terminals 26 and 28 are connected to a source of alternating voltage E, such as by conductors 31, 32. The terminal 30 is connected to one side of a control coil of a relay or contactor 33, the other side of the coil being connected through suitable push button control means 34 to the line conductor 31. A thermally responsive element such as a thermistor 35 having a negative thermal coefficient of resistance is connected between the terminal 29 and the line conductor 32. The contactor 33 controls a set of contacts 36 which in turn control the current fed to a motor 37. The contactor 33 also preferably includes hold-in contacts 38 in order to make it unnecessary to hold the push button 34 in to keep the motor running. This connection provides non-automatic restarting. If automatic restarting is desired, the hold-in contacts may be omitted and the switch 34 may be replaced by a conventional on-off switch having a mechanically held "on" position, and preferably placed in the line 31 ahead of terminal 26.

The entire voltage E appears across the combination of voltage-dropping resistor 25, rectifier 24, relay coil 12 and resistor 27. The value of resistor 25 is preferably chosen to reduce the net voltage across the relay coil 12 to a relatively low value. For instance, when the device is used in connection with a voltage E in the neighborhood of 110 volts, a relay 12 is chosen which operates in the area of 4 volts and resistor 25 is chosen which drops the effective voltage appearing across the relay 12 to a voltage between 3.5 and 6.0 volts, depending on the value of the control signal from the thermistor.

The operation of the relay at such low voltage is made possible by the use of rectifier 24 which transforms the alternating current voltage into a pulsating direct current.

The relay coil 12 and the resistor 27 are both shunted by the thermistor 35, which is preferably embedded in the windings of the motor 37 so that it is directly exposed and sensitive to the temperature of these windings.

In operation, assuming the contactor 33 to be closed and the motor 37 to be running, the resistance of the thermistor 35 and the other circuit parameters are preferably chosen so that the voltage appearing across the relay coil 12 is sufficient to hold the relay in its energized or closed condition, that is, in contact with the stationary contact 15, as shown in Figure 1 (see "Normal Running" portion of Figure 3 graph). When an overload occurs on the motor 37, the motor begins heating and the temperature of the windings begins to rise. This causes the resistance of the thermistor 35 and, therefore, the voltage drop across it, to decrease. Since the thermistor 35 shunts the coil 12 and the resistor 27, the effective voltage appearing across the relay 12 likewise decreases. (See "Overload Running" portion of Figure 3 graph.) This condition continues until the voltage across the relay coil 12 reaches the relay drop-out point, at which time the relay opens and the contact 13 moves out of contact with the stationary contact 15 and into contact with the stationary contact 14.

When the relay 12 drops out, the line connection to the contactor coil 33 is broken, and the contactor therefore opens, removing the motor 37 from the line and also opening hold-in contacts 38. When the relay contact 13 comes into contact with stationary contact 14, it short-circuits the resistor 27, thereby causing the total voltage drop existing across the thermistor 35 to appear across the relay coil 12, and instantly increasing the voltage appearing across the relay 12.

The value of the resistor 27 is preferably chosen so that the increase of the voltage appearing across the relay coil 12 at this time is almost, but not quite, enough to cause the relay to close in again. This abrupt change is indicated by the rise in the vertical voltage line at the instant the relay drops out in the graph of Figure 3.

During the cooling period which follows, while the motor is removed from the line, the resistance of the thermistor 35 increases, thereby increasing the voltage which appears across the relay coil 12. This condition is illustrated in the "Motor Stopped" period in the chart of Figure 3. This condition continues until the voltage appearing across the relay coil 12 once again builds up to the pull-in point, at which time the relay 12 again closes, moving the movable contact 13 out of contact with the contact 14 and into contact with the contact 15. This again completes the circuit to the contactor coil 33 making it possible to start the motor by pushing the push button 34.

When the relay 12 closes, the resistor 27 is once again inserted in series with the coil 12, thereby immediately dropping the voltage appearing across the coil to a value close to the relay drop-out point.

By means of this arrangement, almost any desired sensitivity may be obtained. In the embodiment illustrated, for instance, the pull-in and drop-out voltage points of the relay 12 may be as much as 5 volts apart, and yet the circuit is capable of operating at a signal change of fourtenths of a volt. The actual limits of sensitivity in any particular instance will be determined by practical considerations, such as the degree of circuit stability desired, the amount of line voltage fluctuation expected, and the sensitivity of the signal source. In comparing the effective signal values across the relay coil immediately before and after actuation, therefore, the terms "close to," "slightly less than," "slightly higher than" etc., are used herein and in the claims with these considerations in mind as limiting factors.

While the voltage drop across a variable impedance has been shown as the source of the control voltage for the relay 12, various other signal sources may of course be used, such as a photocell, a thermocouple, etc. When a negative coefficient-of-resistance element or thermistor, having a self-heating characteristic, is used, however, certain other unexpected advantages and characteristics are realized.

Figures 6A, 6B:
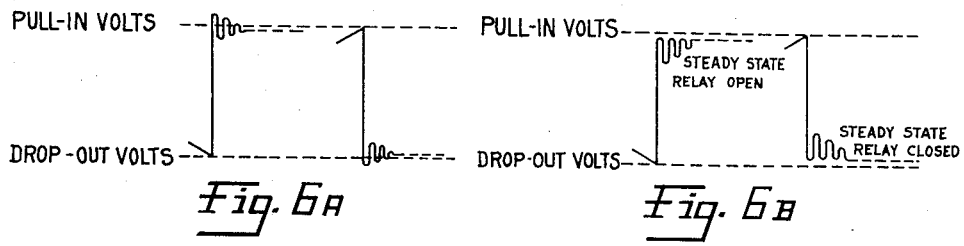
Figures 6A and 6B are graphical illustrations of voltage variations occurring across the relay coil under different circuit conditions.

For instance, in view of the sudden increase or decrease of effective signal voltage caused by the insertion or removal of resistor 27 appearing across the inductor coil 12, paralleled by a condenser 23, voltage fluctuations or swings (or transients) might ordinarily be expected, roughly as illustrated in Figure 6A. Thus the votlage would rise instantaneously to a point slightly beyond its final steady-state value, and after several oscillations finally settle to this value. Since the steady-state value of the voltage is close to pull-in voltage at one time and close to dropout voltage at another time, overshooting would normally cause oscillation or chattering of the relay contacts. This action is avoided, however, in applicant's invention. It will be noted that when the resistor 27 is removed from the circuit, the entire resistance of the circuit from the point between the rectifier 24 and the line side 32, is decreased slightly, thereby slightly decreasing the voltage appearing across the thermistor 35. the current through thermistor 35 will therefore also decrease slightly. Since this current has a self-heating effect upon the thermistor, this effect is decreased and therefore the net resistance of the thermistor increases slightly. Thus the final value of voltage appearing across the thermistor after shorting out the resistor 27 is slightly higher than it would be if not for this self-heating effect. The result is that while the voltage oscillations still occur, they settle to a value which is not appreciably less than the peak of the initial surge. This value can therefore be adjusted to be very close to the pull-in voltage of the relay without danger of the voltage temporarily exceeding such value, as indicated in Figure 6B.

A similar action occurs when the relay 12 closes and inserts the resistor 27 into the circuit. In Figure 6B, the voltage is shown approaching the pull-in value as the thermistor 35 cools. Upon reaching the pull-in value, the relay closes and immediately inserts the resistor 27 in the circuit thereby sharply decreasing the voltage appearing across the coil 12. The effect of inserting resistance 27 in the portion of the circuit in parallel with thermistor 35 is to slightly increase the current through the thermistor. Because of the self-heating effect of such current on the thermistor, the resistance of the thermistor decreases slightly. This has the effect of further decreasing the voltage across the coil 12. The voltage then follows the oscillations indicated finally reaching a steady-state value close to but slightly above the relay drop-out value.

Referring to Figure 8, I have shown a portion of a graph in which relay volts are plotted as a function of motor temperature. It will be observed that the voltage appearing across the relay 12 decreases with increasing temperature across the thermistor, until the drop-out point A is reached. At this point, the voltage immediately increases, because of the shorting out of the resistor 27, to the value B. The voltage fluctuations referred to in the previous paragraphs have been omitted from this figure for the sake of simplicity. As the thermistor 35 thereafter cools, the voltage appearing across the relay begins to further increase until the pull-in value of voltage C is reached. It will be observed, however, that the slope of the voltage rise between points B and C, as the thermistor is cooling, is slightly greater than the slope of the line between points D and A as the thermistor is heating. This is because of the fact that while the relay is energized and resistance 27 is in the circuit, only a portion of a given voltage change occurring across thermistor 35 appears across relay coil 12. When the relay is de-energized, however, the total amount of any voltage change occurring across the thermistor appears across the relay coil.

Following the closing in of the relay 12, the voltage appearing across the relay immediately drops as the resistor 27 is inserted in series with the relay 12, the voltage then returning to the point on the curve which it had previously passed through at this reclosing temperature.

The fact that the slope of the curve between points B and C is greater than the slope of the curve between points D and A is significant because it indicates that maximum use is being made of the resistance vs. temperature characteristics of the thermistor. Thus, the most important sensitivity aspect is represented by the amount that the thermistor must cool following a drop-out operation in order to produce a voltage change sufficient to reclose the relay.

The operation of the subject invention is greatly enhanced by the provision of the overcenter or snap-acting type relay shown. This relay avoids any zero contact pressure point as the pull of the relay core builds up. The pull-in point of the relay can therefore be adjusted very critically and will remain constant.

Initial adjustment of the motor overload protector is accomplished as follows. First, with the relay maintained in the closed-circuit position by current therethrough, the tension of the armature spring 20 of the relay is adjusted by adjusting screw 20A until the relay opens at the desired trip temperature. Secondly, with the relay opened, the gap of the armature is adjusted, by adjusting screw 21, until the relay closes at the desired reset temperature.

In a specific application, the values of the particular components are as follows:

Resistance 25—3,000 ohms
Resistance 27—300 ohms
Resistance of relay coil 12—150 ohms
Resistance of thermistor—400 ohms cold, 300 ohms hot
Pull-in voltage of relay—3.53 volts
Drop-out voltage of relay—1.86 volts
Capacitor 23—25 mfd.

In Figure 2 I have shown my invention adapted for the protection of a three-phase motor. In this embodiment, two thermistors 35, 35', are connected in parallel, one thermistor being embedded in each of two windings of a three-phase motor. As indicated, the remaining elements and connections in this embodiment are substantially identical to the form of Figure 1.

The motor-protecting relay of my invention is relatively insensitive to line voltage fluctuations because of the fact that it utilizes an extremely low voltage relay deriving its voltage from a relatively high voltage source. Thus, for instance, a fluctuation of 10% in the line voltage of a 110 volts would produce a fluctuation amounting to 11 volts. The corresponding fluctuation appearing across the relay coil 12 would be in the neighborhood of only ⅓ of a volt. The reduction of the absolute value of the fluctuation is important because the friction involved in relays of the type used has been reduced to a minimum and can be expected to be substantially constant regardless of the voltage rating of the relay. This being the case, the lower the absolute value of such fluctuations, the less they will affect the relay.

While I have shown only two embodiments of my invention, it will be readily apparent that many modifications thereof may be made by those skilled in the art and I therefore intend by the appended claims to cover all such modifications as fall within the true spirit and scope of my invention.

What I claim as new and desire to secure by Letters Patent of the United States is:

1. An electric relay comprising a core member, a coil adapted to energize said core member, an armature movable toward and away from said core member between attracted and unattracted positions, biasing means biasing said armature away from said core member, an elongated resilient switching member mounted at one end on a support fixed relative to said core member and carrying a first contact adjacent its outer end, a relatively stationary contact adapted to be contacted by said first contact, operating means for said switching member comprising an elongated resilient operating member having two side portions extending parallel to and generally coplanar with said switching member and having one end thereof mounted on said fixed support adjacent said mounted end of said switching member, the outer ends of said side portions being interconnected and having an extension adapted to rest against said armature, said operating member having an inherent bias tending to move the outer end thereof toward said core member, said inherent bias of said operating member being weaker than the said armature biasing means whereby said operating member is normally maintained in a first position by said armature member when said armature member is in said unattracted position, said armature member when attracted by said core member permitting movement of said switching member under said inherent bias toward said core member to a second position, said interconnected ends of said side portions moving from one side to the other of said switching member as said operating member moves between said first and second positions, an overcenter compression spring connected between the outer end of said switching member and the interconnected side portions of said operating member whereby said switching member is moved into and out of engagement with said stationary contact with a snap action as said armature moves between said attracted and unattracted positions.

2. In an overtemperature responsive apparatus, a pair of terminals adapted for connection to a source of electric current supply of substantially constant voltage, an electroresponsive device having an actuating winding connected in series circuit relation with a resistor and a current limiting impedance between said terminals, said device including a member movable from a deactuated position when said winding is deenergized to an actuated position when said winding is energized, means controlled by said movable member to at least partially disable said current limiting impedance when said winding is deenergized, and a negative temperature coefficient resistor adapted to be exposed to the temperature of a zone subject to overheating and connected in series with said resistor and in shunt circuit relation with the series circuit through said winding and current limiting impedance, whereby changes in the effective value of said impedance effected by said movable member reduce the voltage differential between actuation and deactuation of said member and the variations in self-heating of said negative temperature coefficient resistor caused by such changes in impedance value are in a direction to further reduce said voltage differential.

3. In an overtemperature responsive apparatus, a pair of terminals adapted for connection to a source of electric current supply of substantially constant voltage, an electromagnetic relay having an actuating winding connected in series circuit relation with a resistor and a current limiting impedance between said terminals, said relay including an armature movable from a dropped-out position when said winding is deenergized to a picked-up position when said winding is energized, contact means controlled by said armature to short circuit at least a portion of said current limiting impedance when said winding is deenergized, and to unshunt said portion when said winding is energized, and a negative temperature coefficient resistor adapted to be exposed to the temperature of a zone subject to overheating and connected in series with said resistor and in shunt circuit relation with the series circuit through said winding and current limiting impedance, whereby changes in the effective magnitude of said impedance effected by said armature reduce the voltage differential between pickup and dropout of said relay and the variations in self heating of said negative temperature coefficient resistor caused by such changes in impedance are in a direction to further reduce said voltage differential.

4. An electric motor overload protective apparatus comprising a pair of terminals adapted for connection to a source of electric current supply of substantially constant voltage, an electromagnetic relay having an actuating winding connected in series circuit relation with a current limiting resistor and a second resistor between terminals, said relay including an armature movable from a dropped-out position when said winding is deenergized to a picked-up position when said winding is energized, said second resistor absorbing a major portion of said supply voltage, auxiliary contact means controlled by said armature to short circuit at least a portion of said current limiting resistor when said winding is deenergized and to unshunt said portion when said winding is energized, and a negative temperature coefficient resistor adapted to be directly embedded in the windings of an electric motor and connected in shunt circuit relation across said actuating winding and said current limiting resistor, whereby pickup and dropout of said relay automatically recalibrates said relay by changing the effective magnitude of said current-limiting resistor thereby to reduce the voltage differential between pickup and dropout, and whereby variations in self-heating of said negative temperature coefficient resistor due to such recalibration are constantly in a direction to further reduce said voltage differential.

References Cited in the file of this patent

UNITED STATES PATENTS

| | | |
|---|---|---|
| 2,203,920 | O'Hagan | June 11, 1940 |
| 2,302,320 | Hintze | Nov. 17, 1942 |
| 2,313,973 | Sorensen | Mar. 16, 1943 |
| 2,443,122 | Smith | June 8, 1948 |
| 2,446,474 | Harrold | Aug. 3, 1948 |